United States Patent
Wangemann et al.

(10) Patent No.: US 9,859,801 B2
(45) Date of Patent: Jan. 2, 2018

(54) FUEL CELL SYSTEM IN A BIPOLAR HIGH-VOLTAGE NETWORK AND METHOD FOR OPERATING A BIPOLAR HIGH-VOLTAGE NETWORK

(71) Applicant: Airbus Operations GmbH, Hamburg (DE)

(72) Inventors: Joerg Wangemann, Magdeburg (DE); Hauke-Peer Luedders, Hamburg (DE); Alexander Kaiser, Wellendingen (DE)

(73) Assignee: Airbus Operations GmbH, Hamburg (DE)

( * ) Notice: Subject to any disclaimer, the term of this patent is extended or adjusted under 35 U.S.C. 154(b) by 326 days.

(21) Appl. No.: 14/628,584

(22) Filed: Feb. 23, 2015

(65) Prior Publication Data
US 2015/0244277 A1    Aug. 27, 2015

(30) Foreign Application Priority Data
Feb. 21, 2014   (DE) ........................ 10 2014 203 159

(51) Int. Cl.
*B60L 1/00*   (2006.01)
*H02M 3/335*   (2006.01)
(Continued)

(52) U.S. Cl.
CPC ....... *H02M 3/33569* (2013.01); *B60R 16/033* (2013.01); *B64D 41/00* (2013.01);
(Continued)

(58) Field of Classification Search
CPC ........... H02M 3/33569; H02M 3/1582; H02M 7/487; B60R 16/033; B64D 41/00;
(Continued)

(56) References Cited

U.S. PATENT DOCUMENTS 7,087,327 B2    8/2006 Pearson
7,304,867 B2 *  12/2007 Usui ................. H02M 3/33561
                                                     336/183
(Continued)

FOREIGN PATENT DOCUMENTS

DE        19907369        8/2000
DE        10059392        6/2002
(Continued)

OTHER PUBLICATIONS

"Analyse einer neuartigen elektrischen konverterarchitektur zur integration von brennstoffzellen auf desagtsystemebene", A. Luecken et al., 2012 (cited on p. 2 of Specification).
(Continued)

*Primary Examiner* — Kenneth B Wells
(74) *Attorney, Agent, or Firm* — Greer, Burns & Crain Ltd.

(57) ABSTRACT

A bipolar high-voltage network for an aircraft or spacecraft. The network includes at least one DC-DC converter having two unipolar input connections and two bipolar output connections as well as a reference potential connection, at least two fuel cell stacks which are coupled in series between the two unipolar input connections, and at least two discharge diodes, each connected in parallel with the output connections of one of the at least two fuel cell stacks. The DC-DC converter is operable selectively in a step-up converter mode of operation or a step-down converter mode of operation, as a function of an input voltage between the unipolar input connections.

11 Claims, 3 Drawing Sheets

(51) Int. Cl.
B60R 16/033 (2006.01)
B64D 41/00 (2006.01)
H02M 3/158 (2006.01)
*H02M 7/487* (2007.01)
*H02J 1/00* (2006.01)

(52) U.S. Cl.
CPC ....... *H02M 3/1582* (2013.01); *B64D 2221/00* (2013.01); *H01M 2250/20* (2013.01); *H02J 2001/004* (2013.01); *H02M 7/487* (2013.01); *Y02T 90/32* (2013.01)

(58) Field of Classification Search
CPC ............... B64D 2221/00; Y02T 90/32; H01M 2250/20; H02J 2001/004
See application file for complete search history.

(56) References Cited

U.S. PATENT DOCUMENTS

| | | | |
|---|---|---|---|
| 7,423,415 B2 * | 9/2008 | Hasegawa | H02M 3/1584 323/222 |
| 7,723,965 B2 * | 5/2010 | Lesso | H02M 3/158 323/225 |
| 7,799,481 B2 | 9/2010 | LaBreche | |
| 8,138,638 B2 * | 3/2012 | Mallwitz | H02M 3/33523 307/151 |
| 8,803,344 B2 * | 8/2014 | Kyriakides | H02J 3/386 290/1 R |
| 8,817,492 B2 * | 8/2014 | Rigbers | H02M 3/22 323/906 |
| 2007/0075689 A1 | 4/2007 | Kinder et al. | |
| 2009/0085537 A1 | 4/2009 | Nakabayashi et al. | |
| 2010/0289423 A1 | 11/2010 | Yao et al. | |
| 2013/0200715 A1 | 8/2013 | Pettersson et al. | |
| 2015/0009734 A1 | 1/2015 | Stahl et al. | |

FOREIGN PATENT DOCUMENTS

| | | |
|---|---|---|
| DE | 102006014780 | 10/2007 |
| DE | 102012005974 | 9/2013 |
| EP | 1894768 | 3/2008 |
| EP | 2624433 | 8/2013 |
| WO | 2011020737 | 2/2011 |

OTHER PUBLICATIONS

German Search Report, dated Feb. 21, 2014.

* cited by examiner

FUEL CELL SYSTEM IN A BIPOLAR HIGH-VOLTAGE NETWORK AND METHOD FOR OPERATING A BIPOLAR HIGH-VOLTAGE NETWORK

CROSS-REFERENCES TO RELATED APPLICATIONS

This application claims the benefit of the German patent application No. 102014203159.1 filed on Feb. 21, 2014, the entire disclosures of which are incorporated herein by way of reference.

FIELD OF THE INVENTION

The present invention relates to a fuel cell system in a bipolar high-voltage network and to a method for operating a bipolar high-voltage network, in particular for distributing electrical power, generated by fuel cells, in an aircraft or spacecraft.

BACKGROUND OF THE INVENTION

High bipolar voltages, for example ±270 V, are frequently required in aircraft. Generators and corresponding rectifiers are conventionally used to provide voltages of this type.

EP 2 624 433 A1 discloses two non-insulating DC-DC converter units, connected in parallel, having a neutral point, which is galvanically separated from a neutral point of the DC-DC converter unit, of an AC voltage filter, connected downstream from the DC-DC converter units, for supplying DC voltage generated by photovoltaic cells to an AC voltage network.

US 2009/0085537 A1 discloses a non-insulating boost converter for DC voltages, in which a unipolar input DC voltage is converted into a bipolar output DC voltage by two coupled boost converter units.

The document A. Lücken, H. Lüdders, T. Kut, S. Dickmann, F. Thielecke, D. Schulz: "Analyse einer neuartigen elektrischen Konverterarchitektur zur Integration von Brennstofzellen auf Gesamtsystemeben" [Analysis of a new electric converter architecture for the integration of fuel cells at the overall system level], German Aeronautics and Astronautics Conference 2012, Berlin, German Society for Aeronautics and Astronautics, Bonn, 2012, discloses a fuel cell system comprising two fuel cell stacks, arranged connected in series, which respectively supply positive and negative output voltages for a DC-DC converter module for generating positive and negative HVDC voltages for a bipolar DC voltage network in an aircraft.

U.S. Pat. No. 7,087,327 B2 discloses a fuel cell matrix for use in a series or parallel combination for supplying electrical power to a power network. U.S. Pat. No. 7,799,481 B2 discloses connection options for fuel cell stacks for setting the power output.

SUMMARY OF THE INVENTION

However, there is a need for solutions for supplying electrical power from fuel cells to high-voltage networks of aircraft which are reliable and high-availability but at the same time have a low system weight.

Therefore, a first aspect of the invention provides a bipolar high-voltage network for an aircraft or spacecraft, comprising at least one DC-DC converter which has two unipolar input connections and two bipolar output connections as well as a reference potential connection, at least two fuel cell stacks which are coupled in series between the two unipolar input connections, and at least two discharge diodes, which are each coupled in parallel with the output connections of one of the at least two fuel cell stacks, the DC-DC converter being operable selectively in a step-up converter mode of operation or a step-down converter mode of operation, as a function of an input voltage between the unipolar input connections.

Further, a second aspect of the invention provides an aircraft or spacecraft comprising one or more bipolar high-voltage networks according to the invention in accordance with the first aspect.

According to a third aspect, the invention further provides a method for operating a bipolar high-voltage network according to the invention, comprising the steps of operating the DC-DC converter in a step-down converter mode of operation, to output a bipolar voltage between the bipolar output connections and the reference potential connection of the DC-DC converter, if electrical power from the at least two fuel cell stacks is being fed to the unipolar input connections of the DC-DC converter, and operating the DC-DC converter in a step-up converter mode of operation, to output a bipolar voltage between the bipolar output connections and the reference potential connection of the DC-DC converter, if electrical power from fewer than the at least two fuel cell stacks is being fed to the unipolar input connections of the DC-DC converter.

The method has the advantage that, depending on the number of active or operable fuel cell stacks, the bipolar high-voltage network can continue to be operated in a mode of operation having restricted operating conditions ("degraded mode of operation"), at least so as to be able to maintain a temporary emergency mode of operation.

According to one embodiment of the high-voltage network according to the invention, the DC-DC converter may comprise a non-insulating DC-DC converter. As a result of the configuration as a non-insulating DC-DC converter, system weight can advantageously be saved, since heavy components such as transformers or additional storage throttles can be omitted.

According to a further embodiment of the high-voltage network according to the invention, the DC-DC converter may comprise a first DC-DC converter module, which is coupled via a module input connection to a first of the unipolar input connections of the DC-DC converter, via a module reference potential connection to the reference potential connection of the DC-DC converter, and via a module output connection to a first of the bipolar output connections of the DC-DC converter, and a second DC-DC converter module, which is coupled via a module input connection to a second of the unipolar input connections of the DC-DC converter, via a module reference potential connection to the reference potential connection of the DC-DC converter, and via a module output connection to a second of the bipolar output connections of the DC-DC converter.

According to further embodiments of the high-voltage network according to the invention, the DC-DC converter modules may respectively comprise inverting buck-boost converters, cascaded step-down/step-up converters, cascaded two-point step-down/step-up converters, uncontrolled or controlled two-point NPC converters or split-pi converters.

According to a further embodiment of the high-voltage network according to the invention, the high-voltage network may further comprise a controlled three-point NPC rectifier, which is coupled to the two bipolar output connections and to the reference potential connection of the DC-DC converter at the input and which comprises three AC voltage phase connections at the output, and an LC filter level, which is coupled to the three AC voltage phase connections of the controlled three-point NPC rectifier. As a result of these additional converter levels, an AC voltage network can advantageously be supplied from the bipolar high-voltage network.

According to a further embodiment of the high-voltage network according to the invention, the high-voltage network may further comprise a first DC voltage intermediate circuit, which is coupled between the unipolar input connections of the DC-DC converter, and a second DC intermediate circuit, which is coupled between the bipolar output connections of the DC-DC converter.

BRIEF DESCRIPTION OF THE DRAWINGS

In the following, the invention is disclosed in greater detail in connection with and with reference to the embodiments, given by way of example, as disclosed in the accompanying drawings.

The accompanying drawings are provided for an improved understanding of the present invention, and illustrate variants of the invention, given by way of example. They are provided to illustrate principles, advantages, technical effects and possible variations. Naturally, other embodiments and many of the intended advantages of the invention are also conceivable, in particular in view of the detailed description of the invention provided in the following. The elements in the drawings are not necessarily shown to scale, and are shown in a simplified or schematic manner in some cases for clarity. Like reference numerals denote like or equivalent components or elements.

DETAILED DESCRIPTION OF THE PREFERRED EMBODIMENTS

Although special embodiments are disclosed and described herein, it is clear to a person skilled in the art that a wide range of further alternative and/or equivalent implementations for the embodiments can be selected, without substantially departing from the basic idea of the present invention. In general, all variations, modifications and alterations of the embodiments disclosed herein are also to be considered as covered by the invention.

Fuel cells within the meaning of the present invention mean all energy converters which can convert chemical reaction energy of a continuously supplied fuel and an oxidizing agent into electrical energy. Fuel cell stacks mean in particular energy converters which are constructed from a stack of individual planar fuel cells. Since each individual fuel cell is relatively thin and provides a comparatively low voltage, connecting a few to a few hundred fuel cells in series in a fuel cell stack can provide a high output voltage. Fuel cells within the meaning of the present invention may comprise alkaline fuel cells, polymer electrolyte fuel cells, direct methanol fuel cells, acid fuel cells, molten carbonate fuel cells, solid oxide fuel cells, direct carbon fuel cells and other fuel cell types.

Bipolar appliances within the meaning of the present invention mean all loads, power consumers, electrical energy stores, energy sources or sub-networks which have three electrical connections and can output and/or receive two different, in particular opposite-polarity, electrical DC voltages between two of the connections in each case. Bipolar high-voltage networks within the meaning of the present invention mean corresponding electrical networks which can be operated using high bipolar voltage, in other words which can receive and/or output bipolar voltage.

Figure 1:
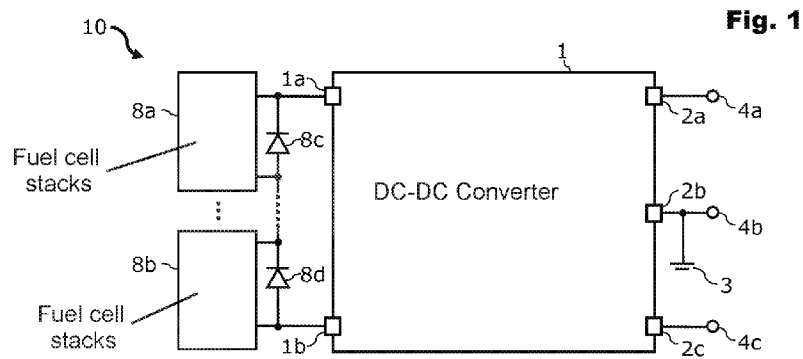
FIG. 1 is a schematic illustration of a bipolar high-voltage network in accordance with an embodiment of the invention.

FIG. 1 is a schematic illustration of a bipolar high-voltage network 10. The bipolar high-voltage network 10 comprises a DC-DC converter 1, which is supplied with a unipolar input voltage at two input connections 1a and 1b and converts said voltage into a bipolar output voltage at the three output connections 2a, 2b and 2c. The output connections 2a and 2c are each DC voltage output connections 2a and 2c, which are each coupled to tapping terminals 4a and 4c. The output connection 2b is a reference potential connection 2b, which is coupled to an earth- or reference potential 3 and can be tapped at a reference potential terminal 4b. The terminals 4a, 4b and 4c may be coupled to a bipolar network (not explicitly shown), for example to a bipolar high-voltage network of an aircraft or spacecraft. If the bipolar high-voltage network 10 is used in an aircraft, a high DC voltage, which is bipolar in relation to the reference potential connection 2b, for example ±270 V, can be tapped at the tapping terminals 4a and 4c. The reference potential 3 of the reference potential connection 2b can be set by correspondingly actuating the DC-DC converter 1, and need not necessarily be central between the two potentials at the output connections 2a and 2c. For example, a high asymmetric bipolar voltage may also be provided at the tapping terminals 4a and 4c in relation to the reference potential connection 2b, in other words the absolute values of the two bipolar voltage portions generated by the bipolar high-voltage network 10 may be different.

If the electrical connections of one (or more) unipolar appliance(s) 8a and/or 8b are coupled to one of the two unipolar input connections 1a and 1b, the DC-DC converter 1 can generate a respective branch of the bipolar voltage supply at the output connections 2a and 2c in relation to the reference potential connection 2b from the unipolar input voltage.

As unipolar appliances 8a and 8b, FIG. 1 shows fuel cell stacks as pure DC voltage sources. These fuel cell stacks 8a and 8b are connected in series between the unipolar input connections 1a and 1b, each of the fuel cell stacks 8a and 8b being bridgeable via a discharge diode 8c or 8d, each of which is coupled in parallel with the output connections of the two fuel cell stacks 8a and 8b. The number of fuel cell stacks 8a and 8b is merely shown by way of example; it is also possible to connect more than two fuel cell stacks 8a and 8b to the unipolar input connections 1a and 1b in series. Moreover, it is also possible to connect further DC-DC converters 1 (not explicitly shown) to the series connection of the fuel cell stacks 8a and 8b, each DC-DC converter 1 being coupled in parallel with the further DC-DC converters 1. Using various DC-DC converters 1, it is also possible to provide different (sub-) networks with different bipolar output voltages.

The discharge diodes 8c and 8d are provided for bridging or circumventing the respectively associated fuel cell stacks 8a and 8b if the respective fuel cell stack 8a or 8b is deactivated or fails, and can therefore be considered as "conditional switches". The DC-DC converter 1 is operable selectively in a step-up converter mode of operation or a step-down converter mode of operation, as a function of an input voltage between the unipolar input connections 1a and 1b, in such a way that the DC-DC converter 1 is operated in the step-down converter mode of operation in the case of full supply from both fuel cell stacks 8a and 8b, and is only operated in the step-up converter mode of operation in the case of a partial capacity from one of the two fuel cell stacks 8a and 8b. The input voltage of all of the fuel cell stacks 8a and 8b in normal operation can be configured in such a way that the DC-DC converter 1 can be corrected at an optimum power efficiency, in other words in an input voltage range which is very close to or slightly above the desired output voltage.

Figure 2:
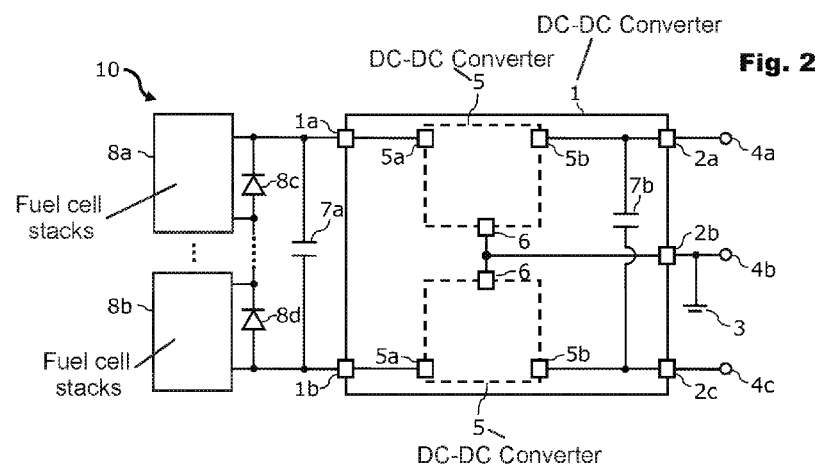
FIG. 2 is a schematic illustration of the bipolar high-voltage network according to FIG. 1 in greater detail in accordance with a further embodiment of the invention.

A configuration option, given by way of example, for the DC-DC converter 1 in FIG. 1 is shown in greater detail in FIG. 2. The DC-DC converter 1 comprises two separately actuated DC-DC converter modules 5. The DC-DC converter modules 5 are each coupled via a module input connection 5a to one of the unipolar input connections 1a and 1b, via a module reference potential connection 6 to the reference potential connection 2b, and via a module output connection 5b to one of the bipolar output connections 2a and 2c of the DC-DC converter 1.

The first (upper) DC-DC converter module 5 may be configured to provide a first high DC voltage between the module output connection 5b and the module reference potential connection 6. Analogously, the second (lower) DC-DC converter module 5 may be configured to provide a second high DC voltage between the associated module output connection 5b and the module reference potential connection 6. The first and second high DC voltages may have different signs with respect to the reference potential 3, and in particular be equal in magnitude, for example ±270 V or ±135 V. Naturally, it may also be possible to actuate the two DC-DC converter modules 5 to output high DC voltages of different magnitudes.

The configuration in FIG. 1 provides an implicit redundancy of the high-voltage network 10 with respect to high impedances ("open circuit state") at one of the output connections 2a or 2c or to short circuits between the earth and one of the output connections 2a or 2c. This advantageously makes it possible to operate the high-voltage network 10 in a restricted mode of operation ("degraded operation"), in such a way that additional safety measures only need to be undertaken to a limited extent. In particular, measures in the back end of the high-voltage network 10, such as conditional switching elements or diodes, can be dispensed with, whilst accordingly simplifying the implementation and reducing costs.

Input and output intermediate circuits comprising intermediate circuit capacitors 7a and 7b are used for buffering voltage surges and suppressing common mode variation respectively.

FIG. 3 to 8 schematically illustrate variants of DC-DC converter modules 5 of this type, given by way of example. The DC-DC converter modules 5 of FIGS. 3 to 8 may be used in a DC-DC converter, such as the DC-DC converter 1 in FIG. 1 or 2. Advantageously, two converter topologies of the same type may be implemented in parallel with one another. All of the converter topologies comprise non-insulating DC-DC converters. Non-insulating DC-DC converters have a low system weight, since complex, heavy transformers can be largely dispensed with.

Figure 3:
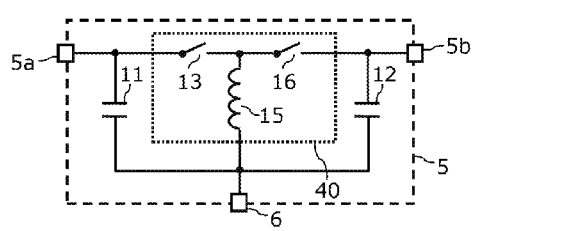
FIG. 3 is a schematic illustration of a DC-DC converter module for a high-voltage network according to FIG. 1 or 2 in accordance with a further embodiment of the invention.

As is shown in FIG. 3, the DC-DC converter modules 5 can be implemented as bidirectional inverting buck-boost converters 40 comprising charging capacitors 11 and 12, converter switches 13 and 16 and a storage throttle 15. This topology can provide both boost and buck operation in both converter directions, and offers the smallest number of active components.

Figure 4:
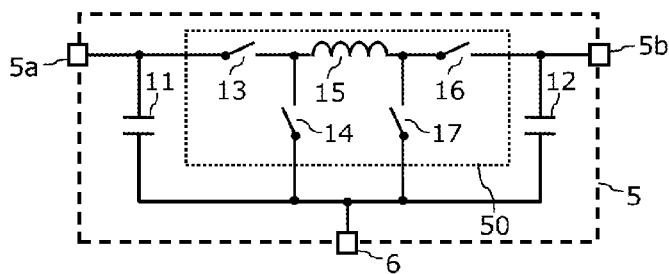
FIG. 4 is a schematic illustration of a DC-DC converter module for a high-voltage network according to FIG. 1 or 2 in accordance with a further embodiment of the invention.

FIG. 4 shows DC-DC converter modules 5 each in the form of cascaded step-down/step-up converters 50 comprising charging capacitors 11 and 2, converter switches 13, 14, 16 and 17, and a storage throttle 15. Cascaded step-down/step-up converters 50 can operate efficiently in terms of power if the ratio between the input and output voltage is close to one.

Figure 5:
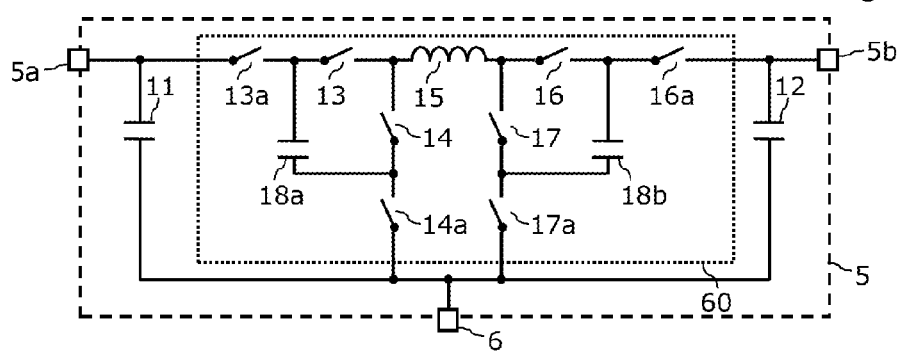
FIG. 5 is a schematic illustration of a DC-DC converter module for a high-voltage network according to FIG. 1 or 2 in accordance with a further embodiment of the invention.

FIG. 5 shows the DC-DC converter modules 5 each in the form of cascaded two-point step-down/step-up converters 60, which comprise charging capacitors 11 and 12, converter switches 13, 13a, 14, 14a, 16, 16a, 17 and 17a and a storage throttle 15. In each case, "flying capacitors" 18a and 18b are connected between half-bridges formed from two converter switches. Cascaded two-point step-down/step-up converters 60 of this type, often referred to as flying capacitor multilevel converters/inverters (FMCI), are provided with a bridge voltage at the outer connections of the half-bridges thereof, in such a way that the central connection is used for tapping the output voltage. The "flying capacitors" have a potential which is constantly shifted with respect to an input connection of the half bridges.

Figure 6:
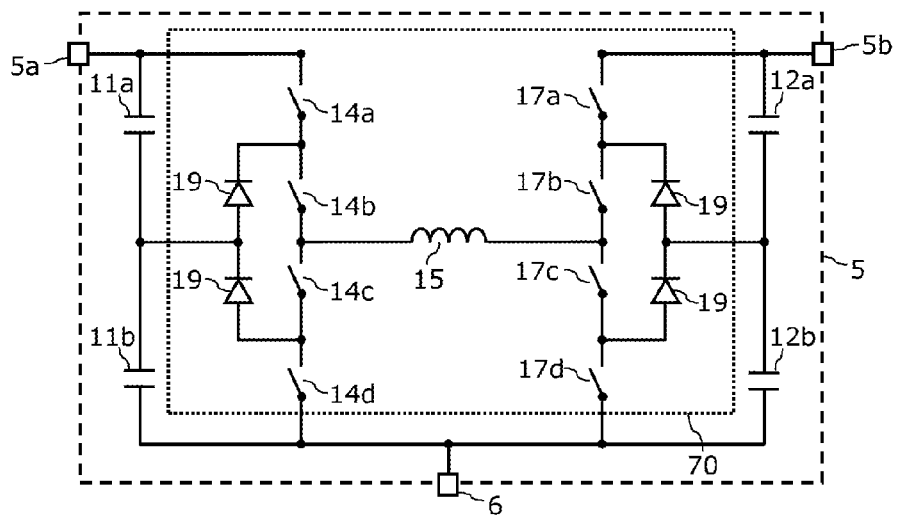
FIG. 6 is a schematic illustration of a DC-DC converter module for a high-voltage network according to FIG. 1 or 2 in accordance with a further embodiment of the invention.

According to FIG. 6, the DC-DC converter modules 5 may each comprise uncontrolled or controlled two-point NPC converters 70. For this purpose, zero-volt diodes 19 ("neutral-point-clamped diodes", NPC diodes) may in each case be connected in the center-point tap between multilevel bridge branches consisting of converter switches 14a, 14b, 14c, 14d and 17a, 17b, 17, 17d. It may also be possible to replace the zero-volt diodes 19 with active switch elements such as power semiconductor switches or to connect active switching elements in parallel with the zero-volt diodes 19, in such a way that an ANPC ("active neutral-point-clamped") rectifier can be implemented. As a result of a suitable switching strategy for the active switching elements, such as IGBT or MOSFET power semiconductor switches, the output voltage can thus be actively restricted with respect to the reference potential of the rectifier circuit. Charging capacitors 11 and 11a or 12 and 12a, connected in series, are used to stabilize the voltage of the respectively generated multiple voltage levels. The use of two-point NPC converters 70 increases the efficiency, to the detriment of the complexity of the circuit.

Figure 7:
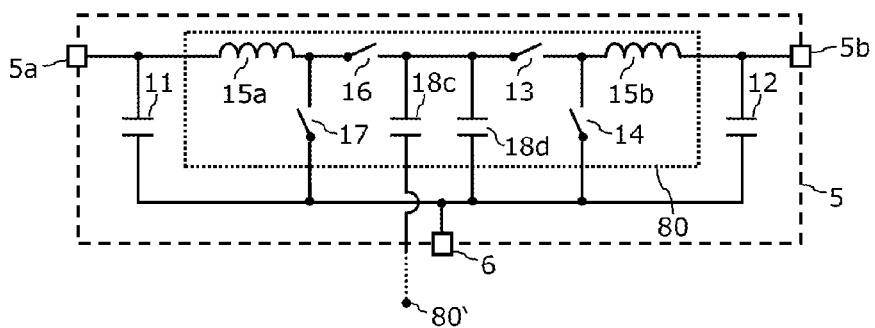
FIG. 7 is a schematic illustration of a DC-DC converter module for a high-voltage network according to FIG. 1 or 2 in accordance with a further embodiment of the invention.

As is shown in FIG. 7, the DC-DC converter modules 5 may each comprise split-pi converters 80, which are constructed from charging capacitors 11, 12, converter switches 13, 14, 16 and 17, and two storage throttles 15a, 15b. The split-pi converter 80 is a series connection of two synchronous converters, which are buffered by an intermediate circuit capacitor 18d positioned in between. In addition to the intermediate circuit capacitor 18d, an intermediate circuit capacitor 18c is provided, which couples a central tap of the voltage-bearing bus rail between the synchronous converters of one of the split-pi converters 80 to the respective bus rail of the other split-pi converter 80' of a DC-DC converter module 5. Using the split-pi converter 80, both buck and boost converter operation are possible in both power flow directions. As a result of the continuous power flow, the split-pi converter 80 is particularly efficient and offers good electromagnetic compatibility (EMC).

Figure 8:
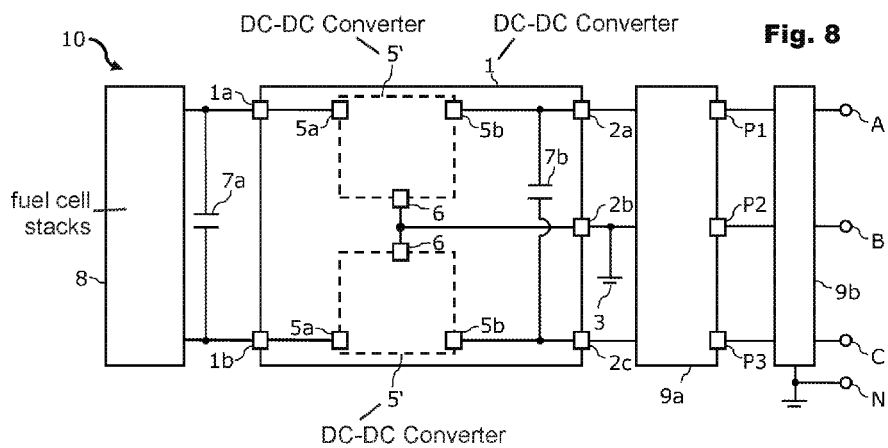
FIG. 8 is a schematic illustration of a bipolar high-voltage network in accordance with a further embodiment of the invention.

As is shown in FIG. 8, the high-voltage network 10 may comprise a controlled three-point NPC rectifier 9a, which is coupled at the input to the two bipolar output connections 2a, 2c and to the reference potential connection 2b, so as to connect a bipolar high-voltage network 10 to an AC voltage network. At the output, the three-point NPC rectifier 9a comprises three AC voltage phase connections P1, P2 and P3, which are coupled via an LC filter level 9b to line terminals A, B and C and to a neutral line N of an AC voltage network. Via the three-point NPC rectifier 9a, both unregulated and regulated AC voltage loads can be operated, as is shown in detail for example in Barbosa, P.; Steimer, P.; Steinke, J.; Meysenc, L.; Winkelnkemper, M.; Celanovic, N., "Active Neural-Point-Clamped Multilevel Converters," Power Electronics Specialists Conference, 2005 (PESC '05), IEEE 36th, pages 2296-2301, June 2005.

Figure 9:
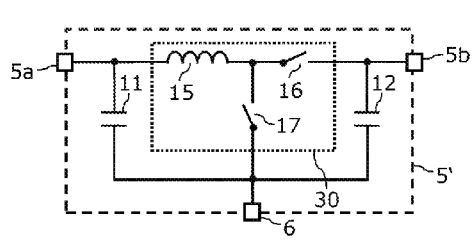
FIG. 9 is a schematic illustration of a DC-DC converter module for a high-voltage network according to FIG. 8 in accordance with a further embodiment of the invention.

In addition, the DC-DC converter modules of the DC-DC converter 1 in FIG. 8 may be configured as non-insulating DC voltage modules 5 in accordance with one of the variants in FIGS. 3 to 7. However, since the buck- or step-down converter mode of operation can also be ensured by way of the three-point NPC rectifier 9a, it is sufficient to implement the DC-DC converter modules of the DC-DC converter 1 in FIG. 8 as non-insulating DC-DC converter modules 5' in accordance with FIG. 9. FIG. 9 shows a bidirectional step-up converter 30 comprising charging capacitors 11 and 12, converter switches 16 and 17, and a storage throttle 15 as variant implementations for the DC-DC converter modules 5' in FIG. 8. This converter type is particularly advantageous for applications having a high power requirement, in which the ratio between the input and output voltages is close to one.

The converter circuits shown in FIGS. 3 to 9 may each be configured as a power semiconductor switch, for example MOSFET switches, IGBT switches, BJT switches, JFET switches, bipolar transistors or similar switching elements.

Figure 10:
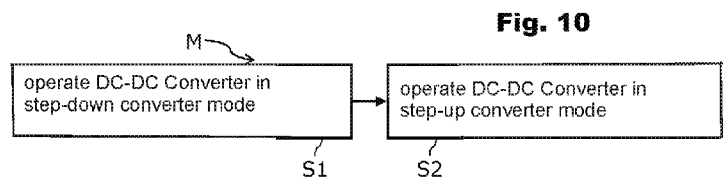
FIG. 10 is a schematic illustration of a method for operating a bipolar high-voltage network in accordance with a further embodiment of the invention.

FIG. 10 is a schematic illustration of a method M for operating a bipolar high-voltage network, in particular the high-voltage networks 10 shown and described in connection with FIGS. 1 to 9. The method M can, for example, be used to ensure the provision of a desired bipolar output voltage independently of an actual input voltage at the DC-DC converter 1.

The method M comprises a first step S1 of operating the DC-DC converter 1 in a step-down converter mode of operation to output a bipolar voltage between the bipolar output connections 2a and 2c and the reference potential connection 2b of the DC-DC converter 1. The step-down converter mode of operation is active in particular when electrical power is being supplied to the unipolar input connections 1a, 1b of the DC-DC converter 1 from sufficiently many fuel cell stacks 8a, 8b so as to keep the unipolar input voltage at the input connections 1a, 1b higher than the bipolar output voltage.

Finally, in step S2, DC-DC converters 1 can be operated in a step-up converter mode of operation to output a bipolar voltage between the bipolar output connections 2a and 2c and the reference potential connection 2b of the DC-DC converter 1. This is possible in particular when electrical power is being supplied to the unipolar input connections 1a, 1b of the DC-DC converter 1 from fewer than the at least two fuel cell stacks 8a, 8b, in other words when the unipolar input voltage at the input connections 1a, 1b is lower than the required level of the bipolar output voltage. In this case, the step-up converter mode of operation is linked with limited efficiency, albeit without collapse of the bipolar output voltage. As a result, less redundancy is required in the configuration of the fuel cell stack, since the high-voltage network is still operable in an emergency mode of operation even in the event of individual fuel cell stacks failing.

Figure 11:
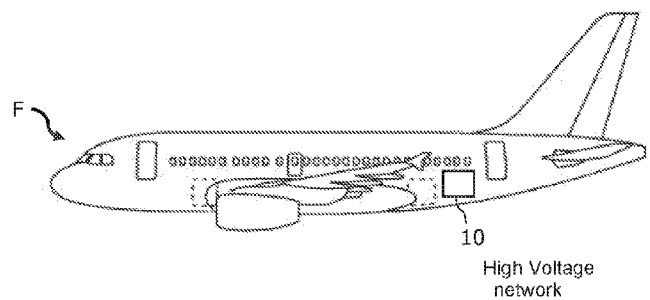
FIG. 11 is a schematic illustration of an aircraft comprising a bipolar high-voltage network in accordance with a further embodiment of the invention.

FIG. 11 is a schematic illustration of an aircraft F comprising a bipolar high-voltage network, for example a bipolar high-voltage network 10 in accordance with FIGS. 1 to 9. The high-voltage network 10 can be used to implement a bipolar voltage supply using DC voltage, for example ±270 V, in the aircraft F for DC loads in the aircraft F.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bipolar high-voltage network for an aircraft or spacecraft, comprising:
   at least one non-insulating DC-DC converter having two unipolar input connections and two bipolar output connections as well as a reference potential connection;
   at least two fuel cell stacks being coupled in series between the two unipolar input connections; and
   at least two discharge diodes, each being connected in parallel with the output connections of one of the at least two fuel cell stacks,
      the DC-DC converter being operable selectively in a step-up converter mode of operation or a step-down converter mode of operation, as a function of an input voltage between the unipolar input connections, the DC-DC converter comprising a first DC-DC converter module, coupled via a module input connection to a first of the unipolar input connections of the DC-DC converter, via a module reference potential connection to the reference potential connection of the DC-DC converter, and via a module output connection to a first of the bipolar output connections of the DC-DC converter, and wherein the DC-DC converter comprises a second DC-DC converter module, coupled via a module input connection to a second of the unipolar input connections of the DC-DC converter, via a module reference potential connection to the reference potential connection of the DC-DC converter, and via a module output connection to a second of the bipolar output connections of the DC-DC converter.

2. The bipolar high-voltage network according to claim 1, wherein the DC-DC converter modules each comprise inverting buck-boost converters.

3. The bipolar high-voltage network according to claim 1, wherein the DC-DC converter modules each comprise cascaded step-down/step-up converters.

4. The bipolar high-voltage network according to claim 1, wherein the DC-DC converter modules each comprise cascaded two-point step-down/step-up converters.

5. The bipolar high-voltage network according to claim 1, wherein the DC-DC converter modules each comprise uncontrolled or controlled two-point NPC converters.

6. The bipolar high-voltage network according to claim 1, wherein the DC-DC converter modules each comprise split-pi converters.

7. The bipolar high-voltage network according to claim 1, further comprising:
   a first DC voltage intermediate circuit, coupled between the unipolar input connections of the DC-DC converter; and
   a second DC intermediate circuit, coupled between the bipolar output connections of the DC-DC converter.

8. A bipolar high-voltage network for an aircraft or spacecraft, comprising:
   at least one DC-DC converter having two unipolar input connections and two bipolar output connections as well as a reference potential connection;
   at least two fuel cell stacks being coupled in series between the two unipolar input connections;
   at least two discharge diodes, each being connected in parallel with the output connections of one of the at least two fuel cell stacks;
   a controlled three-point NPC rectifier, which is coupled to the two bipolar output connections and to the reference potential connection of the DC-DC converter at the input and which comprises three AC voltage phase connections at the output; and
   an LC filter module, which is coupled to the three AC voltage phase connections of the controlled three-point NPC rectifier,
   the DC-DC converter being operable selectively in a step-up converter mode of operation or a step-down converter mode of operation, as a function of an input voltage between the unipolar input connections.

9. The bipolar high-voltage network according to claim 8, further comprising:
   a first DC voltage intermediate circuit, coupled between the unipolar input connections of the DC-DC converter; and
   a second DC intermediate circuit, coupled between the bipolar output connections of the DC-DC converter.

10. An aircraft or spacecraft comprising at least one bipolar high-voltage network, the bipolar high-voltage network comprising:
   at least one DC-DC converter having two unipolar input connections and two bipolar output connections as well as a reference potential connection;
   at least two fuel cell stacks being coupled in series between the two unipolar input connections; and
   at least two discharge diodes, being each connected in parallel with the output connections of one of the at least two fuel cell stacks,
   the DC-DC converter being operable selectively in a step-up converter mode of operation or a step-down converter mode of operation, as a function of an input voltage between the unipolar input connections,
   the DC-DC converter comprising a first DC-DC converter module, coupled via a module input connection to a first of the unipolar input connections of the DC-DC converter, via a module reference potential connection to the reference potential connection of the DC-DC converter, and via a module output connection to a first of the bipolar output connections of the DC-DC converter, and wherein the DC-DC converter comprises a second DC-DC converter module, coupled via a module input connection to a second of the unipolar input connections of the DC-DC converter, via a module reference potential connection to the reference potential connection of the DC-DC converter, and via a module output connection to a second of the bipolar output connections of the DC-DC converter.

11. A method for operating a bipolar high-voltage network, the bipolar high-voltage network comprising at least one non-insulating DC-DC converter having two unipolar input connections and two bipolar output connections as well as a reference potential connection, at least two fuel cell stacks being coupled in series between the two unipolar input connections; and at least two discharge diodes, each being connected in parallel with the output connections of one of the at least two fuel cell stacks, the DC-DC converter being operable selectively in a step-up converter mode of operation or a step-down converter mode of operation, as a function of an input voltage between the unipolar input connections, the DC-DC converter comprising a first DC-DC converter module, coupled via a module input connection to a first of the unipolar input connections of the DC-DC converter, via a module reference potential connection to the reference potential connection of the DC-DC converter, and via a module output connection to a first of the bipolar output connections of the DC-DC converter, and wherein the DC-DC converter comprises a second DC-DC converter module, coupled via a module input connection to a second of the unipolar input connections of the DC-DC converter, via a module reference potential connection to the reference potential connection of the DC-DC converter, and via a module output connection to a second of the bipolar output connections of the DC-DC converter, the method comprising:
   operating the DC-DC converter in a step-down converter mode of operation to output a bipolar voltage between the bipolar output connections and the reference potential connection of the DC-DC converter when electrical power is being supplied to the unipolar input connections of the DC-DC converter from the at least two fuel cell stacks; and
   operating the DC-DC converter in a step-up converter mode of operation to output a bipolar voltage between the bipolar output connections and the reference potential connection of the DC-DC converter, when electrical power is being supplied to the unipolar input connections of the DC-DC converter from fewer than the at least two fuel cell stacks.

* * * * *